(12) United States Patent
Yamanaka et al.

(10) Patent No.: US 9,376,083 B2
(45) Date of Patent: Jun. 28, 2016

(54) FAR-SIDE AIRBAG APPARATUS

(71) Applicant: TOYODA GOSEI CO., LTD., Kiyosu-shi, Aichi-ken (JP)

(72) Inventors: Takayuki Yamanaka, Kiyosu (JP); Yasushi Masuda, Kiyosu (JP); Yuji Matsuzaki, Kiyosu (JP); Masayoshi Kishimoto, Tokyo (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/807,015

(22) Filed: Jul. 23, 2015

(65) Prior Publication Data
US 2016/0031406 A1    Feb. 4, 2016

(30) Foreign Application Priority Data

Jul. 29, 2014 (JP) .................... 2014-154108
Aug. 7, 2014 (JP) .................... 2014-161793

(51) Int. Cl.
*B60R 21/16* (2006.01)
*B60R 21/231* (2011.01)
*B60R 21/233* (2006.01)
(Continued)

(52) U.S. Cl.
CPC ......... *B60R 21/23138* (2013.01); *B60R 21/207* (2013.01); *B60R 21/233* (2013.01); *B60R 21/237* (2013.01); *B60R 21/2338* (2013.01); *B60R 21/26* (2013.01); *B60R 2021/23146* (2013.01); *B60R 2021/23161* (2013.01); *B60R 2021/23316* (2013.01); *B60R 2021/23324* (2013.01); *B60R 2021/23382* (2013.01); *B60R 2021/23386* (2013.01)

(58) Field of Classification Search
CPC .... B60R 21/20; B60R 21/207; B60R 21/216; B60R 2021/2161; B60R 21/23184; B60R 21/2338; B60R 2021/2617
USPC ................ 280/728.2, 730.2, 743.1, 743.2
See application file for complete search history.

(56) References Cited

U.S. PATENT DOCUMENTS

| 7,549,672 B2 * | 6/2009 | Sato ...................... B60R 21/207 280/729 |
| 7,717,459 B2 | 5/2010 | Bostrom et al. |

(Continued)

FOREIGN PATENT DOCUMENTS

| EP | 2 682 311 A1 | 1/2014 |
| GB | 2 322 338 A | 2/1997 |

(Continued)

OTHER PUBLICATIONS

European Search Report issued on Dec. 22, 2015 in the corresponding EP application No. 151760642.

(Continued)

*Primary Examiner* — Toan To
(74) *Attorney, Agent, or Firm* — Posz Law Group, PLC (57) ABSTRACT

A far-side airbag apparatus includes an airbag and an inflator that discharges inflation gas for deploying and inflating the airbag. The airbag is fixed to the seat frame of the backrest of a vehicle seat and is deployed and inflated on the side corresponding to the center of the passenger compartment. The far-side airbag apparatus is configured such that, when the inflator discharges inflation gas, the forward deployment and inflation of the airbag is promoted more than the upward deployment and inflation of the airbag.

20 Claims, 6 Drawing Sheets

(51) Int. Cl.
*B60R 21/2338* (2011.01)
*B60R 21/237* (2006.01)
*B60R 21/207* (2006.01)
*B60R 21/26* (2011.01)

(56) References Cited

U.S. PATENT DOCUMENTS

| | | | |
|---|---|---|---|
| 7,766,374 | B2 | 8/2010 | Abele et al. |
| 8,282,126 | B2 | 10/2012 | Wiik et al. |
| 8,353,527 | B2 | 1/2013 | Sugimoto et al. |
| 2005/0006883 | A1 | 1/2005 | Sato et al. |
| 2005/0236819 | A1 | 10/2005 | Riedel et al. |
| 2009/0001695 | A1* | 1/2009 | Suzuki ............... B60R 21/231 280/730.2 |
| 2011/0025034 | A1 | 2/2011 | Lim et al. |
| 2012/0038137 | A1 | 2/2012 | Wipasuramonton et al. |
| 2012/0049498 | A1 | 3/2012 | Wiik et al. |
| 2013/0328294 | A1 | 12/2013 | Fukawatase et al. |
| 2014/0035264 | A1 | 2/2014 | Fukushima et al. |
| 2014/0042733 | A1* | 2/2014 | Fukawatase ...... B60R 21/23138 280/730.2 |
| 2014/0103625 | A1 | 4/2014 | Thomas et al. |
| 2014/0151984 | A1* | 6/2014 | Fukawatase .......... B60R 21/233 280/730.2 |
| 2015/0274111 | A1* | 10/2015 | Ishida ................. B60R 21/207 280/730.2 |
| 2015/0343985 | A1* | 12/2015 | Sugimoto ......... B60R 21/23138 280/730.2 |
| 2015/0367804 | A1 | 12/2015 | Fujiwara |

FOREIGN PATENT DOCUMENTS

| | | |
|---|---|---|
| JP | 2005-306377 A | 11/2005 |
| JP | 2007-216821 A | 8/2007 |
| JP | 2008-137458 A | 6/2008 |
| JP | 2008-302897 A | 12/2008 |
| JP | 2011-105309 A | 6/2011 |
| JP | 2012-081958 A | 4/2012 |
| WO | 2010/053088 A1 | 5/2010 |
| WO | 2015/075984 A1 | 5/2015 |

OTHER PUBLICATIONS

Office Action dated Mar. 25, 2016 issued in related U.S. Appl. No. 14/807,143.

* cited by examiner

Fig.11

FAR-SIDE AIRBAG APPARATUS

BACKGROUND OF THE INVENTION

The present invention relates to a far-side airbag apparatus that deploys and inflates an airbag toward the center of a passenger compartment.

A far-side airbag apparatus, which deploys and inflates an airbag toward the center of a passenger compartment, is typically located in a vehicle seat used as the driver's seat or the front passenger seat. The far-side airbag apparatus deploys and inflates an airbag toward the center of the passenger compartment to partition the driver's seat and the front passenger seat from each other, thereby protecting an occupant.

A type of a far-side airbag apparatus is known that includes an airbag and a partition wall inside the airbag. The partition wall has holes for regulating the flow of inflation fluid discharged from an inflator in the airbag (for example, U.S. Patent Application Publication 2014/0103625).

The document discloses a far-side airbag apparatus that has in the partition wall a first hole, which is formed to discharge inflation fluid forward, and a second hole, which discharges inflation fluid upward. The diameter of the first hole is set to be greater than that of the second hole so that the airbag is quickly deployed and inflated upward.

In a far-side airbag apparatus located on the side of the backrest of a vehicle seat, the folded airbag is deployed and inflated from a position close to the torso and an arm of the occupant. This can cause the airbag to interfere with a part of the body of the occupant, which would hamper deployment and inflation of the airbag to the proper position.

SUMMARY OF THE INVENTION

Accordingly, it is an objective of the present invention to provide a far-side airbag apparatus that restrains an airbag from interfering with a part of the body of an occupant at an early stage of deployment and inflation of the airbag, thereby allowing the airbag to be deployed and inflated to a proper position.

To achieve the foregoing objective and in accordance with one aspect of the present invention, a far-side airbag apparatus is provided that is configured to be fixed to a seat frame of a backrest of a vehicle seat. The apparatus includes an airbag, an inflation fluid generator, which discharges inflation fluid for deploying and inflating the airbag, and a deployment promoting structure. When the inflation fluid generator discharges inflation fluid, the deployment promoting structure deploys and inflates the airbag toward a center of a passenger compartment and promotes forward deployment and inflation of the airbag more than upward deployment and inflation of the airbag.

According to the above described configuration, when inflation fluid is discharged from the inflation fluid generator, the airbag is deployed and inflated from the backrest of the vehicle seat to the side corresponding to the center of the passenger compartment. For example, the impact of a side collision of the vehicle can displace the occupant seated in the vehicle seat toward the center of the passenger compartment. In such a situation, it is preferable that the airbag be quickly deployed and inflated forward from the backrest of the vehicle seat to properly protect the occupant. In this regard, the above configuration includes a deployment promoting structure that promotes forward deployment and inflation of the airbag more than upward deployment and inflation. This quickly deploys and inflates the airbag forward to partition two seats arranged in the vehicle widthwise direction from each other. Thus, the airbag is restrained from interfering with a part of the body of the occupant at an early stage of the deployment and inflation of the airbag, so that the airbag is deployed and inflated to the proper position.

DESCRIPTION OF THE PREFERRED EMBODIMENTS

Figure 1:
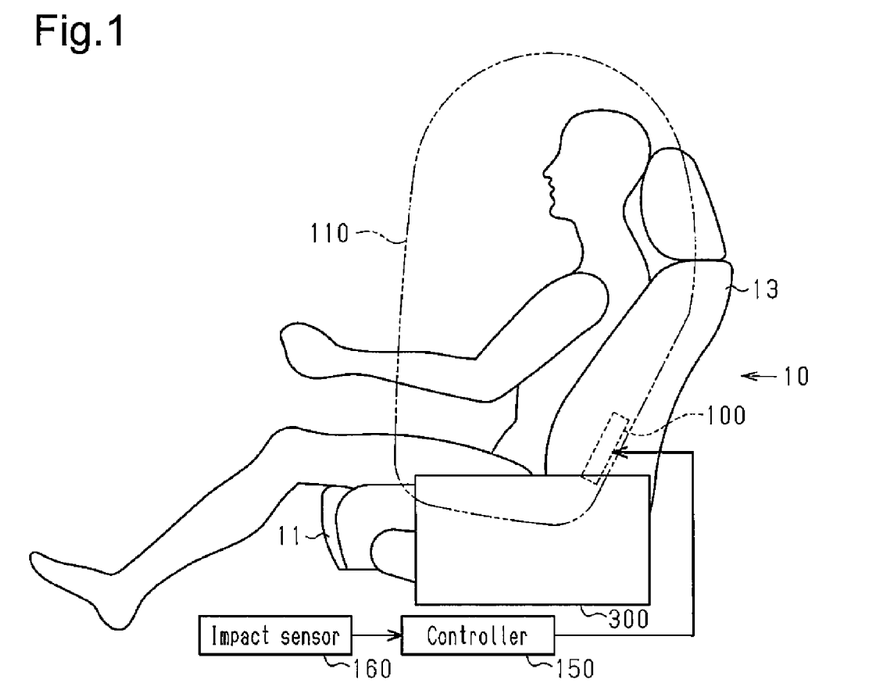
FIG. 1 is a diagram schematically showing the structure of a vehicle seat equipped with a far-side airbag apparatus according to one embodiment.

A vehicle seat 10 in which a far-side airbag apparatus 100 according to one embodiment is installed will now be described with reference to FIGS. 1 to 10. In FIG. 1, the left side corresponds to the front side of the vehicle, and the upper side corresponds to the upper side of the vehicle.

As shown in FIG. 1, the vehicle seat 10 has a seat portion 11 to which a backrest 13 is joined. As indicated by a broken line in FIG. 1, the far-side airbag apparatus 100 is installed in the backrest 13 of the vehicle seat 10. As illustrated in the lower section of FIG. 1, a controller 150 is connected to the far-side airbag apparatus 100, and the controller 150 is connected to an impact sensor 160.

The impact sensor 160 includes an acceleration sensor attached to a side pillar of the vehicle and detects an impact from the side of the vehicle due to, for example, a side collision. Based on a detection signal from the impact sensor 160, the controller 150 outputs a control signal for deploying an airbag 110 to the far-side airbag apparatus 100.

The backrest 13 accommodates the airbag 110 in a folded state of the far-side airbag apparatus 100, which will be described below. When the controller 150 outputs a control signal, the airbag 110 is deployed and inflated as indicated by the long dashed double-short dashed lines in FIGS. 1 and 2. The arrangement position and the vertical dimension of the airbag 110 are determined such that, when the airbag 110 is deployed and inflated, the lower end of the airbag 110 is located below the lower end of a center console box 300 as shown in FIG. 1. Thus, when the airbag 110 is deployed and inflated, the lower end of the airbag 110 enters the space between the occupant seated in the vehicle seat 10 and the center console box 300.

Figure 2:
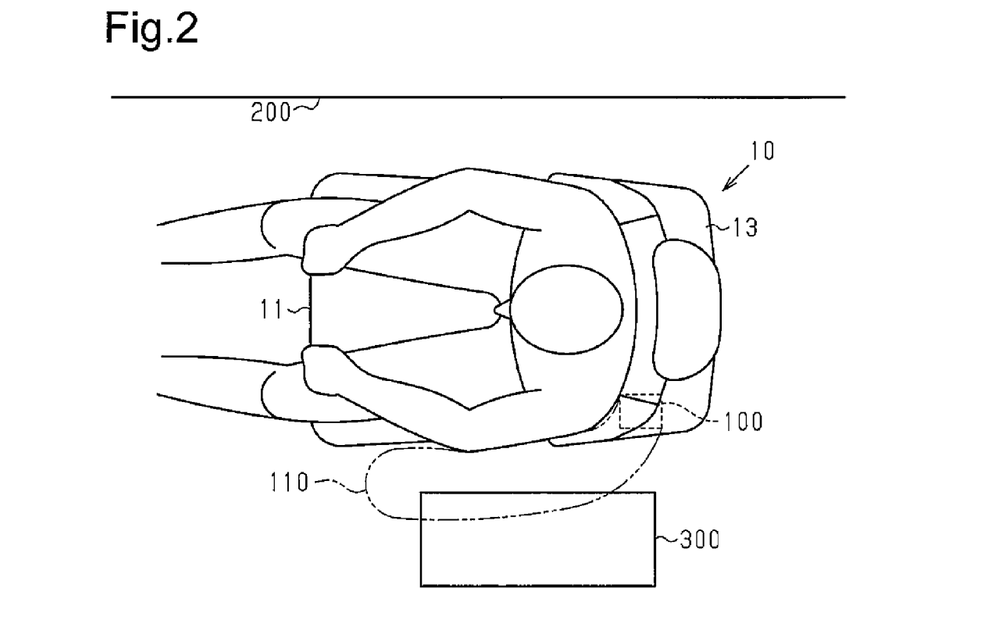
FIG. 2 is a plan view of the vehicle seat.

FIG. 2 is a plan view of the vehicle seat 10. In FIG. 2, the left side corresponds to the front side of the vehicle, and the lower side corresponds to the center of the passenger compartment. The vehicle also has a seatbelt device for restraining the occupant seated in the vehicle seat 10. In FIGS. 1 and 2, the seatbelt device is not illustrated.

Near-side airbag apparatuses have been known that deploy and inflate an airbag between a passenger compartment side wall 200 and an occupant. Such a near-side airbag deploys and inflates an airbag on the side closer to the side wall 200. Unlike near-side airbag apparatuses, the far-side airbag apparatus 100 is accommodated in the side of the vehicle seat backrest 13 that corresponds to the center of the passenger compartment as indicated by the broken line in FIG. 2. When the impact sensor 160 detects an impact from the side of the vehicle, the airbag 110 is deployed and inflated to partition the vehicle seat 10 from the adjacent seat as indicated by the long dashed double-short dashed line in FIG. 2.

Figure 3:
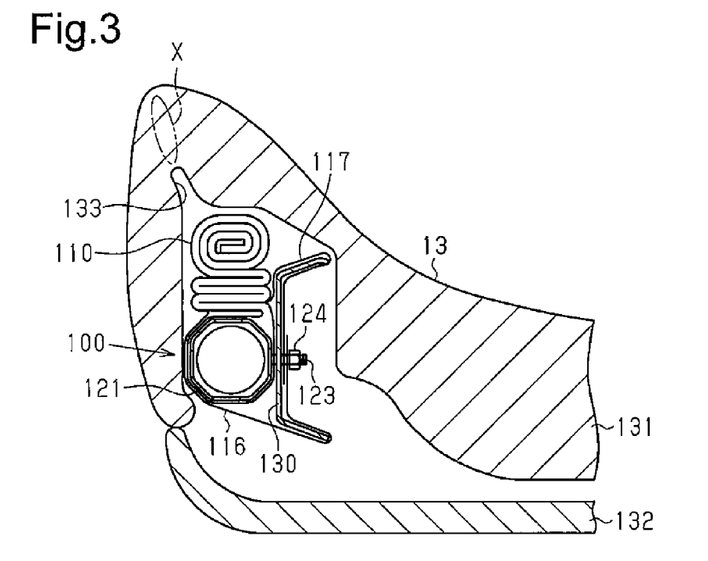
FIG. 3 is a cross-sectional view of the backrest of the vehicle seat in which the far-side airbag apparatus is installed.

With reference to FIG. 3, the structure of the far-side airbag apparatus 100 and the structure of the backrest 13, which accommodates the airbag apparatus 100, will be described. FIG. 3 is a cross-sectional view of a part of the backrest 13 that accommodates the side support on the inner side of the passenger compartment. In FIG. 3, the upper side corresponds to the front side of the vehicle, and the left side corresponds to the center of the passenger compartment.

As shown in FIG. 3, a seat frame 130, which is the framework of the backrest 13, is located inside the backrest 13. The frame 130 is formed by bending a metal plate to have a gutter-like cross section. The seat frame 130 is arranged such that the inside of the gutter faces the center of the seat 10. A pad 131, which is made of an elastic material such as urethane foam, fills the space about the seat frame 130 in the backrest 13. The pad 131 forms a part against which the occupant leans. The pad 131 is covered with seat upholstery, which is not illustrated in FIG. 3. A part of the backrest 13 that is relatively closer to the rear of the vehicle, that is, the back face of the backrest 13, is covered with a hard back plate 132, which is formed of plastic.

As illustrated in FIG. 3, a space for accommodating the far-side airbag apparatus 100 is provided in the backrest 13 in the side that corresponds to the center of the passenger compartment. The pad 131 has a slit 133, which extends from the front end of the space toward the front end of the side support. A part between the slit 133 and the front end of the side support (a part X surrounded by a long dashed double-short dashed line in FIG. 3) is broken when the airbag 110 is deployed and inflated.

The far-side airbag apparatus 100 includes the airbag 110 in a folded state and an inflator 121, which is an inflation fluid generator that discharges inflation fluid for deploying and inflating the airbag 110. In the present embodiment, a pyrotechnic inflator is used as the inflator 121. The inflator 121 is substantially columnar and accommodates a gas generating agent (not shown), which generates inflation gas as inflation fluid for inflating the airbag 110. In place of the pyrotechnic type inflator using the gas generating agent, it is possible to use a hybrid type inflator, which discharges inflation gas by breaking a partition wall of a high-pressure gas cylinder filled with high-pressure gas with a low explosive.

The inflator 121 has two bolts 123 for fixing the inflator 121 to the seat frame 130. The far-side airbag apparatus 100 is fixed to the side surface of the seat frame 130 corresponding to the center of the passenger compartment by threading nuts 124 to the bolts 123 with the bolts 123 passed through the seat frame 130 as illustrated in FIG. 3. In this manner, the far-side airbag apparatus 100 is compactly accommodated and fixed to the backrest 13 by folding the airbag 110 and placing the airbag 110 in front of the inflator 121 as shown in FIG. 3. An outer tension belt 116 and an inner tension belt 117, which will be discussed below, are attached to the airbag 110. A first end of each of the outer tension belt 116 and the inner tension belt 117 is connected to the airbag 110 and is folded together with the airbag 110, and a part of each of the outer tension belt 116 and the inner tension belt 117 is wound about the seat frame 130 as illustrated in FIG. 3.

Specifically, the outer tension belt 116 is wound about the rear end of the seat frame 130 to wrap the part of the airbag 110 that accommodates the inflator 121 and the rear end of the seat frame 130. In contrast, the inner tension belt 117 is wound about the front end of the seat frame 130 to wrap the front end of the seat frame 130.

Second ends of the outer tension belt 116 and the inner tension belt 117, which are wound to the inside of the gutter of the seat frame 130, are connected to the inside of the gutter of seat frame 130 by the bolts 123 and the nuts 124. When attaching the far-side airbag apparatus 100 to the seat frame 130, the bolts 123 are passed through the second end of the outer tension belt 116 and the second end of the inner tension belt 117 before threading the nuts 124 to the bolts 123, and the second ends are overlaid on the inside of the gutter of the seat frame 130. Then, with the second ends of the outer tension belt 116 and the inner tension belt 117 held between the seat frame 130 and the nuts 124, the bolts 123 and the nuts 124 are fastened to each other to fix the far-side airbag apparatus 100 to the seat frame 130. In this manner, the second end of the outer tension belt 116 and the second end of the inner tension belt 117 are connected to the inside of the gutter of the seat frame 130 by the bolts 123 and the nuts 124, which fix the far-side airbag apparatus 100 to the seat frame 130.

The configuration of the airbag 110 will now be described with reference to FIGS. 4 and 5.

Figure 4:
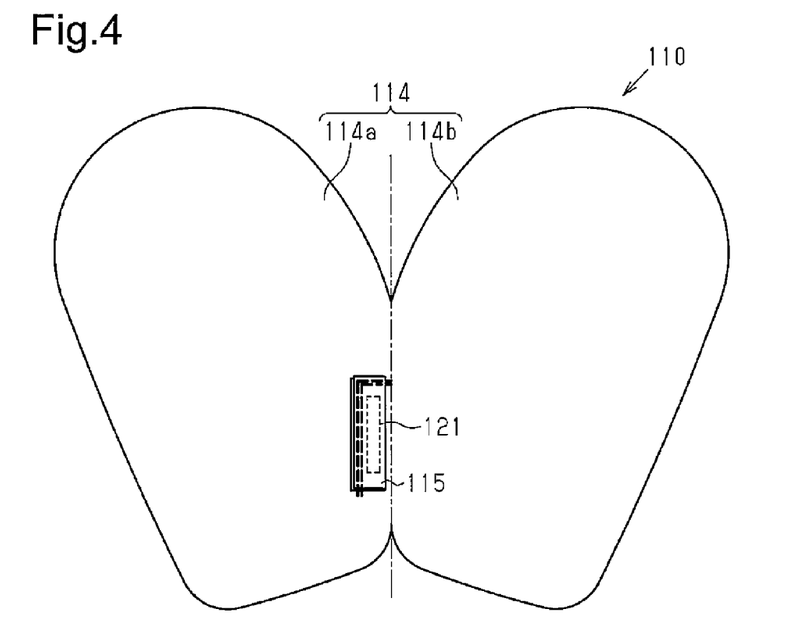
FIG. 4 is a front view showing a base fabric sheet forming the airbag.

As shown in FIG. 4, the airbag 110 is formed by folding a base fabric sheet 114, which has a line-symmetric shape, in half along a folding line defined at the center so that the base fabric sheet 114 is overlaid onto itself. The single base fabric sheet 114 includes an inner panel 114a, which forms the side surface corresponding to the center of the seat 10, and an outer panel 114b, which forms the side surface corresponding to the center of the passenger compartment. The base fabric sheet 114 is preferably formed of a material having high strength and flexibility to be easily folded. The material may be, for example, woven cloth formed of polyester threads or polyamide threads. In FIG. 4, the folding line is indicated by a long dashed short dashed line.

Figure 5:
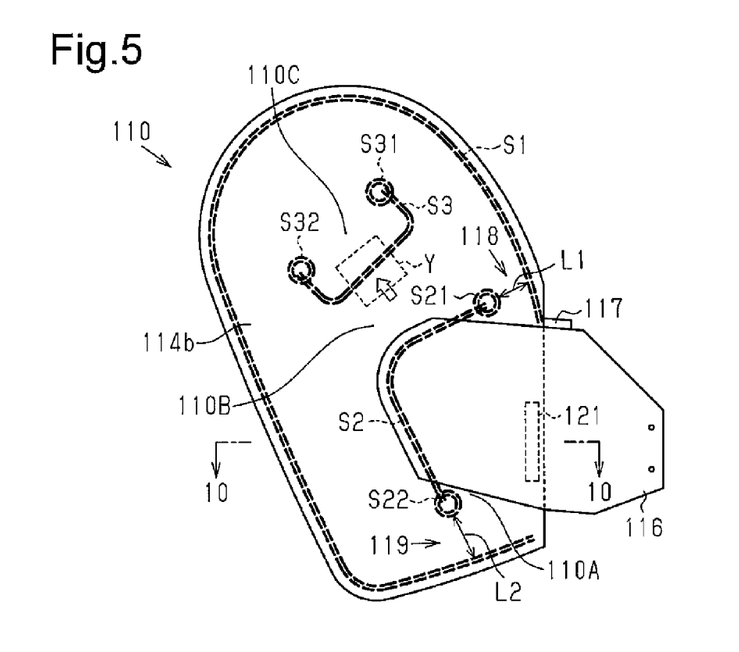
FIG. 5 is a side view showing the airbag before being folded.

The airbag 110 is formed by overlaying the inner panel 114a and the outer panel 114b onto each other and then sewing the peripheral portions of the panels 114a, 114b together with a seam S1, which is indicated by double broken line in FIG. 5. In FIG. 5, the left side corresponds to the front side of the vehicle, and the upper side corresponds to the upper side of the vehicle. In FIG. 5, the side closer to the viewer of the drawing corresponds to the center of the passenger compartment, and the side farther from the viewer of the drawing corresponds to the center of the seat 10.

As shown in FIG. 5, the base fabric sheet 114 of the airbag 110 is folded back on the side closer to the rear of the vehicle. As shown in FIG. 4, an inner tube 115 for accommodating the inflator 121 is provided at the center of the base fabric sheet 114. The inner tube 115 is formed of a square fabric sheet made of the same material as that of the base fabric sheet 114. Specifically, the square fabric sheet is folded in half and laid onto the base fabric sheet 114. In this state, a short side and the long side parallel with the folding line are sewn together with the base fabric sheet 114, so that a tubular shape is obtained.

In the airbag 110, the upper end of the inner tube 115 is closed. That is, the inner tube 115 is sewn to the inner panel 114a to open downward.

A part of the airbag 110 in a right lower corner as viewed in FIG. 5, that is, the lower end in a part closer to the vehicle rear end, has an opening for receiving the inflator 121. The inflator 121 is inserted into the airbag 110 through the opening.

The airbag 110 has multiple inflation chambers, which are formed by sewing the inner panel 114a and the outer panel 114b together. As shown in FIG. 5, the airbag 110 has a first inflation chamber 110A, which is formed by sewing the inner panel 114a and the outer panel 114b together with a seam S2. The first inflation chamber 110A includes a part that accommodates the inflator 121. The airbag 110 has a third inflation chamber 110C by sewing the inner panel 114a and the outer panel 114b together with a seam S3.

The airbag 110 has a second inflation chamber 110B between the first inflation chamber 110A and the third inflation chamber 110C. Thus, the seam S2 is located at the boundary between the first inflation chamber 110A and the second inflation chamber 110B, and the seam S3 is located between the second inflation chamber 110B and the third inflation chamber 110C. Ends S21, S22 of the seam S2 are formed as circles to ensure reinforcement. Ends S31, S32 of the seam S3 are also formed as circles to ensure reinforcement.

As shown in FIG. 5, of the ends S21 and S22 of the seam S2, the end S21, which is located on the upper side, is separated away from the seam S1. When the inflator 121, which is located in the first inflation chamber 110A, discharges inflation gas to deploy and inflate the airbag 110, the inflation gas is discharged upward from the first inflation chamber 110A through between the seam S1 and the end S21 in the airbag 110. That is, a part of the airbag 110 between the seam S1 and the end S21 forms an upward passage 118 that discharges inflation gas upward from the first inflation chamber 110A.

As shown in FIG. 5, of the ends S21 and S22 of the seam S2, the end S22, which is located on the lower side, is also separated away from the seam S1. When the inflator 121, which is located in the first inflation chamber 110A, discharges inflation gas to deploy and inflate the airbag 110, the inflation gas is discharged forward from the first inflation chamber 110A through between the seam S1 and the end S22 in the airbag 110. That is, a part of the airbag 110 between the seam S1 and the end S22 forms a forward passage 119 that discharges inflation gas forward from the first inflation chamber 110A.

A distance L2 between the seam S1 and the end S22 is set to be longer than a distance L1 between the seam S1 and the end S21. Accordingly, the cross-sectional area of the forward passage 119 is larger than that of the upward passage 118.

As described above, the airbag 110 has the outer tension belt 116 and the inner tension belt 117, which are wound about the seat frame 130. As shown in FIG. 5, the distal end, or the first end, of the outer tension belt 116 is sewn to the surface of the outer panel 114b with the seam S2, which defines the first inflation chamber 110A. Accordingly, the distal end, or the first end, of the outer tension belt 116 is connected to a part of the outer panel 114b of the airbag 110 that corresponds to the seam S2. The outer tension belt 116 extends toward the rear of the vehicle and is wound about the seat frame 130 as described above. As shown in FIG. 5, the vertical dimension of the outer tension belt 116 is set such that the upper end is located above the part that accommodates the inflator 121 in the airbag 110 in a spread state.

The distal end, or the first end, of the inner tension belt 117 is sewn to the surface of the inner panel 114a with the seam S2, which defines the first inflation chamber 110A. Accordingly, the distal end, or the first end, of the inner tension belt 117 is connected to a part of the inner panel 114a of the airbag 110 that corresponds to the seam S2. The inner tension belt 117 extends toward the rear of the vehicle and is wound about the seat frame 130 as described above.

A method for folding the airbag 110, which is configured as described above, will now be described with reference to FIGS. 6A to 8B. For illustrative purposes, the outer tension belt 116, the inner tension belt 117, and the seams S1, S2, S3 are not illustrated in FIGS. 6A to 8B, which only schematically show the airbag 110.

Figure 6A:
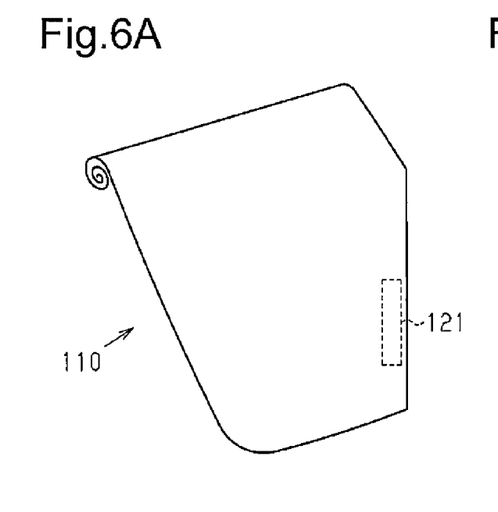
FIGS. 6A and 6B are diagrams showing a manner in which the airbag is folded.
Figure 6B:
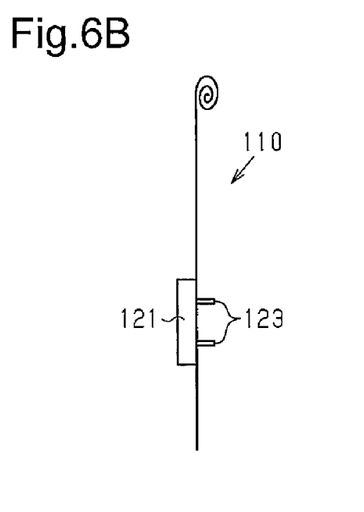

In FIG. 6A, the right side corresponds to the rear side of the vehicle, and the upper side corresponds to the upper side of the vehicle. In FIG. 6A, the side closer to the viewer of the drawing corresponds to the center of the passenger compartment, and the side farther from the viewer of the drawing corresponds to the center of the seat 10. FIG. 6B schematically shows the airbag 110 as viewed from the rear of the vehicle.

Figure 7A:
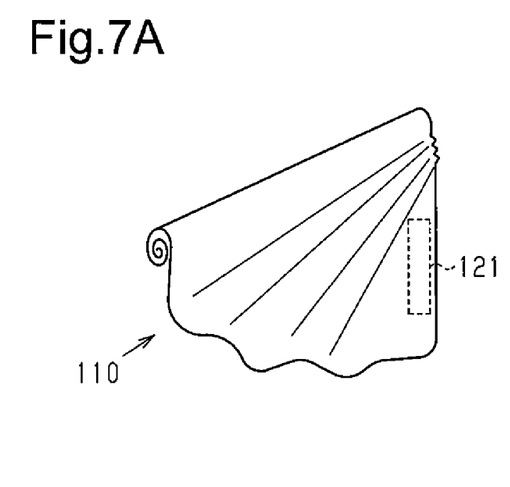
FIGS. 7A and 7B are diagrams showing the manner in which the airbag is folded.
Figure 7B:
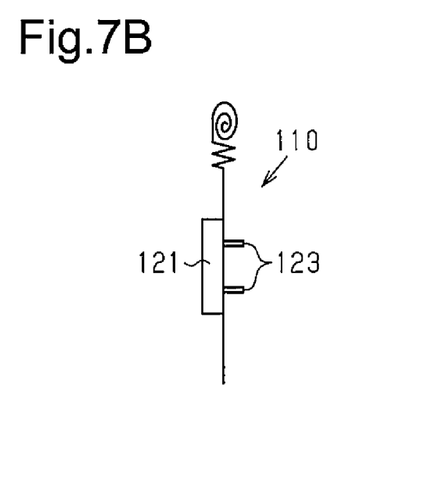

As shown in FIGS. 6A and 6B, the airbag 110 is first roll-folded. Specifically, the airbag 110 is repeatedly folded in one direction from the top toward the part that accommodates the inflator 121, such that the side surface corresponding to the center of the seat 10, that is, the inner panel 114a, is rolled inward. After the airbag 110 is folded halfway by the roll-folding to form a rod-like portion. The remaining portion of the airbag 110 is accordion-folded toward the rear end of the vehicle to form a sectoral shape with an end of the rod-like portion closer to the inflator accommodating portion serving as the center. That is, the remaining portion is accordion-folded such that the other end of the rod-like portion, which has been formed by the roll-folding, approaches the inflator 121. In FIG. 7A also, the right side corresponds to the rear side of the vehicle, and the upper side corresponds to the upper side of the vehicle. In FIG. 7A, the side closer to the viewer of the drawing corresponds to the center of the passenger compartment, and the side farther from the viewer of the drawing corresponds to the center of the seat 10. FIG. 7B schematically shows the airbag 110 as viewed from the rear of the vehicle.

Figure 8A:
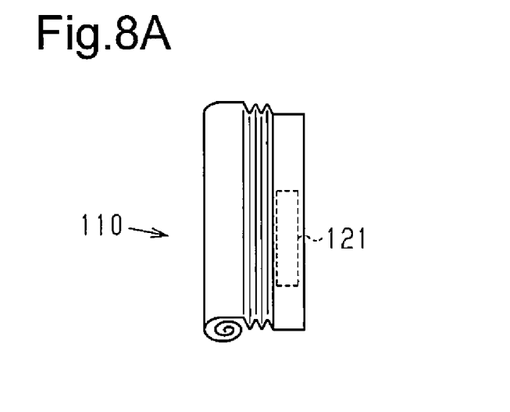
FIGS. 8A and 8B are diagrams showing the manner in which the airbag is folded.
Figure 8B:
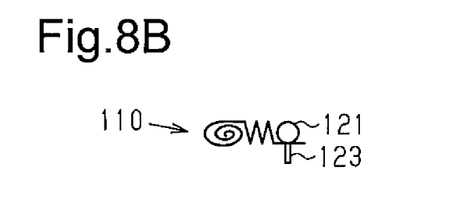

After having been folded in the above described manner, the airbag 110 has the shape illustrated in FIGS. 8A and 8B. In FIG. 8A also, the right side corresponds to the rear side of the vehicle, and the upper side corresponds to the upper side of the vehicle. In FIG. 8A, the side closer to the viewer of the drawing corresponds to the center of the passenger compartment, and the side from the viewer of the drawing corresponds to the center of the seat 10. FIG. 8B schematically shows the airbag 110 as viewed from below.

The far-side airbag apparatus 100, in which the airbag 110 has been folded in the above described manner, is fixed to the seat frame 130 of the vehicle seat 10 and accommodated in the backrest 13 of the vehicle seat 10 as shown in FIG. 3.

The far-side airbag apparatus 100 is configured such that the length of the roll-folded part is longer than the length of the accordion-folded part. Compared to the accordion-folded part, the roll-folded part is likely to stabilize the direction in which the airbag 110 is deployed when being unfolded. In contrast, compared to the roll-folded part, the accordion-folded part is easily and quickly unfolded. Taking into consideration such differences in the properties of the folding manners, the far-side airbag apparatus 100 is designed to promote the forward deployment using the accordion-folded part, while roll-folding the longer part to allow the airbag 110 to be deployed and inflated to a proper position.

Operation of the vehicle seat 10, which is equipped with the above described far-side airbag apparatus 100, will now be described.

When detecting an impact from the side of the vehicle due to, for example, a side collision, the impact sensor 160 outputs a detection signal. Based on the detection signal from the impact sensor 160, the controller 150 outputs a control signal for deploying the airbag 110 to the far-side airbag apparatus 100. In response to the control signal output from the controller 150, the inflator 121 discharges inflation gas as indicated by arrows in FIG. 9.

Figure 9:
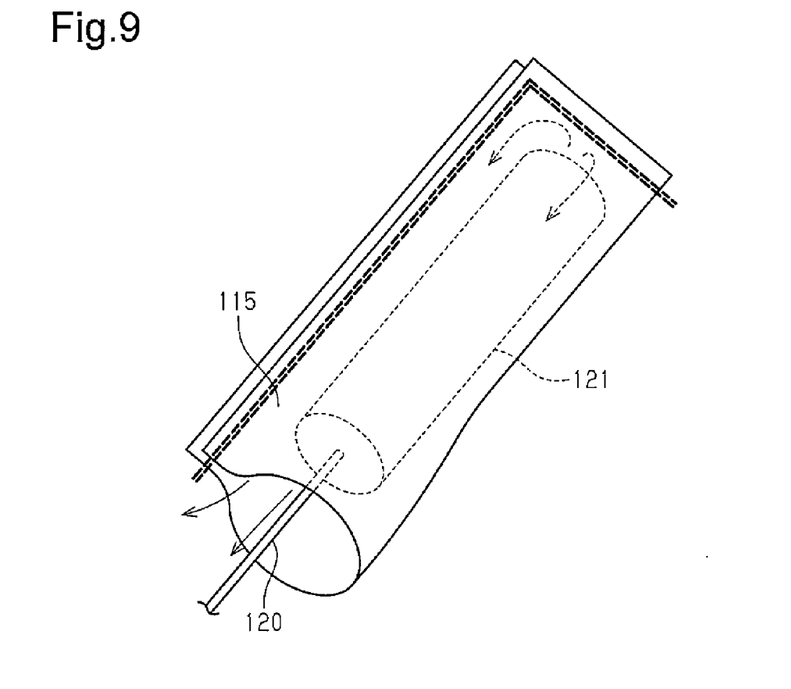
FIG. 9 is a perspective view of an inner tube, illustrating a manner in which inflation gas is discharged.

As shown in FIG. 9, a wire 120 for inputting the control signal to the inflator 121 is connected to the first end in the longitudinal direction of the inflator 121. Inflation gas is discharged from the second end in the longitudinal direction of the inflator 121. On account of the routing of the wire 120, the inflator 121 is accommodated in the inner tube 115 such that the first end, to which the wire 120 is connected, faces downward, and the second end, through which inflation gas is discharged, faces upward.

As described above, the upper end of the inner tube 115 is closed. As indicated by arrows in FIG. 9, the inflation gas discharged from the inflator 121 is discharged into the airbag 110 through the lower open end of the inner tube 115.

When the inflator 121 discharges inflation gas, which is then discharged into the airbag 110 through the inner tube 115, the pressures in the inflation chambers 110A, 110B, 110C are increased. As a result, the airbag 110 is deployed and inflated in the reverse order of the manner in which it has been folded as illustrated in FIGS. 6A to 8B.

Specifically, the accordion-folded part is unfolded as shown in FIGS. 7A and 7B, so that the airbag 110 is deployed and inflated. The airbag 110 is thus deployed and inflated toward the front end of the vehicle. During the forward deployment and inflation, a part between the slit 133 and the front end of the side support (a part X surrounded by the long dashed double-short dashed line in FIG. 3) is broken so that the airbag 110 is projected forward from the side support.

Next, the roll-folded part is unfolded as shown in FIGS. 6A and 6B, so that the airbag 110 is deployed and inflated upward. The airbag 110 has been folded by roll-folding, in which the airbag 110 is repeatedly folded in one direction such that the inner panel 114a is rolled inward. That is, the airbag 110 has been folded by roll-folding, in which the airbag 110 is repeatedly folded in one direction such that the side surface corresponding to the center of the seat 10 is rolled inward. Thus, when the roll-folded part is unfolded, the airbag 110 is deployed and inflated upward while being curved toward the occupant seated in the vehicle seat 10 in an encompassing manner.

During the deployment and inflation of the airbag 110, the inflation gas discharged through the inner tube 115 is diffused into the first inflation chamber 110A and flows into the second inflation chamber 110B via the upward passage 118 and the forward passage 119. As described above, the airbag 110 is configured such that the cross-sectional area of the forward passage 119 is larger than that of the upward passage 118. Accordingly, the amount of inflation gas that is discharged forward through the forward passage 119 and flows into the second inflation chamber 110B is greater than the amount of inflation gas that is discharged upward through the upward passage 118 and flows into the second inflation chamber 110B.

The inflation gas is discharged to the lower part of the first inflation chamber 110A through the lower open end of the inner tube 115. Thus, the inflation gas is more likely to flow to the second inflation chamber 110B through the forward passage 119, which is located at the lower part of the first inflation chamber 110A, than through the upward passage 118, which is located at the upper part of the first inflation chamber 110A.

Thus, in the far-side airbag apparatus 100, the forward deployment and inflation is promoted more than the upward deployment and inflation. That is, when the airbag 110 is deployed and inflated, the airbag 110 is first deployed and inflated forward. The airbag 110, which has been deployed forward, is then deployed upward.

The airbag 110 is therefore quickly deployed and inflated on the inner side of the passenger compartment of the occupant seated in the vehicle seat 10 to partition the vehicle seat 10 from the adjacent front passenger seat. That is, the airbag 110 is deployed and inflated to the proper position for protecting the occupant.

In the process of deployment and inflation of the airbag 110, inflation of the first inflation chamber 110A generates tension in the outer tension belt 116 and the inner tension belt 117, which are connected to the seam S2, which defines the first inflation chamber 110A. The generated tension acts on the airbag 110.

Figure 10:
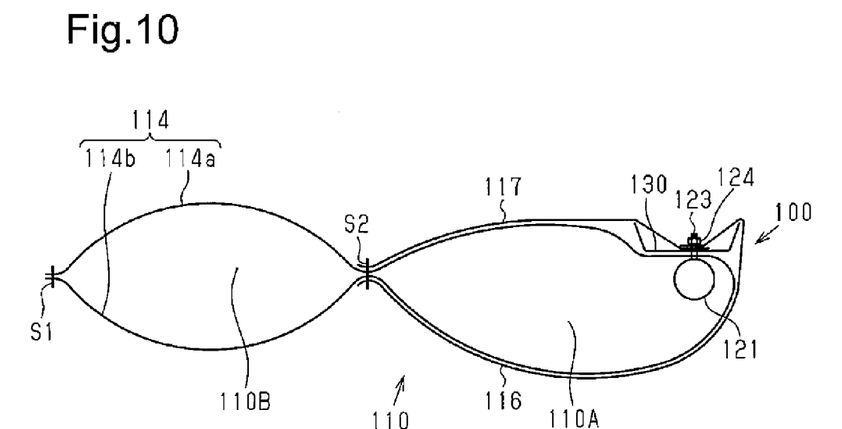
FIG. 10 is a diagram showing a state in which the airbag is deployed and inflated.

FIG. 10 illustrates a state in which the airbag 110 is deployed and inflated and receives the tension of the outer tension belt 116 and the inner tension belt 117. The cross-section of FIG. 10 is taken along line 10-10 of FIG. 5.

As shown in FIG. 10, the first inflation chamber 110A of the airbag 110 is inflated also rearward and toward the center of the passenger compartment from the part that accommodates the inflator 121.

The outer tension belt 116 is wound about the rear end of the seat frame 130 to wrap the part of the airbag 110 that accommodates the inflator 121 and the rear end of the seat frame 130. Thus, when the first inflation chamber 110A is inflated, the part of the airbag 110 to which the outer tension belt 116 is connected receives tension in a direction toward the center of the passenger compartment and tension toward the rear end of the vehicle via the outer tension belt 116. The length of the outer tension belt 116 is set such that when the first inflation chamber 110A is inflated, the outer tension belt 116 extends along the outer panel 114b and to its full length without slackening and generates necessary tension.

In contrast, the inner tension belt 117 is wound about the front end of the seat frame 130 to wrap the front end of the seat frame 130. Thus, when the airbag 110 is deployed and inflated so that the inner tension belt 117 receives tension, the inner tension belt 117 bridges the front end of the seat frame 130 that corresponds to the center of the seat 10 and the side surface of the airbag 110 that corresponds to the center of the seat 10. Thus, when the first inflation chamber 110A is inflated, the part of the airbag 110 to which the inner tension belt 117 is connected receives tension in the direction toward the center of the seat and tension toward the rear end of the vehicle via the inner tension belt 117. The length of the inner tension belt 117 is set such that when the first inflation chamber 110A is inflated, the inner tension belt 117 bridges the front end of the seat frame 130 that corresponds to the center of the seat 10 and the side of the airbag 110 that corresponds to the center of the seat 10 to generate necessary tension.

The rear part of the airbag 110 is surrounded by the outer tension belt 116 together with the seat frame 130 as shown in FIG. 10. Therefore, the airbag 110 is supported by the seat frame 130 not only in the part that is fixed to the seat frame 130 with the bolts 123, but also in the part surrounded by the outer tension belt 116.

In the airbag 110, inflation gas is likely to collect in an area where no obstacle such as a tether 111 exists. As shown in FIG. 5, areas where inflation gas is likely to collect include an area forward of the boundary that linearly connects the end S22 of the seam S2 and the end S32 of the seam S3 and an area rearward of the boundary that linearly connects the end S21 of the seam S2 and the end 31 of the seam S3. These areas are elongated vertically as viewed in the drawing, and the pressure in each of the areas is likely to be higher than the pressure outside the areas. That is, the airbag 110 has, in its front and rear parts, sections that extend vertically and have a high stiffness. As a result, even if an occupant contacts the upper part of the airbag 110, the upper part of the airbag 110 is unlikely to be displaced and bent toward the center of the passenger compartment. Such limitation on deformation of the airbag 110 allows the occupant to be properly protected.

The above described far-side airbag apparatus 100 achieves the following advantages.

(1) For example, the impact of a side collision of the vehicle can displace the body of the occupant seated in the vehicle seat 10 toward the center of the passenger compartment. In such a situation, it is preferable that the airbag 110 be quickly deployed and inflated forward from the backrest 13 of the vehicle seat 10 to properly protect the occupant. In this regard, the far-side airbag apparatus 100 of the present embodiment promotes the forward deployment and inflation of the airbag 110 more than the upward deployment and inflation of the airbag 110. Since the airbag 110 is quickly deployed and inflated forward, the two seats arranged in the vehicle widthwise direction are quickly partitioned from each other by the airbag 110. Thus, the airbag 110 is restrained from interfering with a part of the body of the occupant at an early stage of the deployment and inflation of the airbag 110, so that the airbag 110 is deployed and inflated to the proper position for protecting the occupant. As a result, it is possible to properly protect the occupant seated in the vehicle seat 10 with the airbag 110.

(2) Specifically, when the inflator 121 discharges inflation gas, the accordion-folded part of the airbag 110 is first unfolded to be deployed and inflated. Thereafter, the roll-folded part is unfolded to be deployed and inflated. Thus, the forward deployment and inflation of the airbag 110 is promoted more than the upward deployment and inflation of the airbag 110, which is likely to cause interference with the occupant. As a result, the airbag 110 is quickly deployed and inflated forward from the backrest 13 of the vehicle seat 10 to partition the two seat arranged in the vehicle widthwise direction from each other. The combination of the roll-folded part and the accordion-folded part is one example of the deployment promoting structure.

(3) When the inflator 121 discharges inflation gas, the amount of inflation gas that flows into the second inflation chamber 110B via the forward passage 119 is greater than the amount of inflation gas that flows into the second inflation chamber 110B via the upward passage 118. This promotes the forward deployment and inflation of the airbag 110 more than the upward deployment and inflation. As a result, the airbag 110 is quickly deployed and inflated forward from the backrest 13 of the vehicle seat 10 to partition the two seat arranged in the vehicle widthwise direction from each other. The combination of the forward passage 119 and the upward passage is one example of the deployment promoting structure.

(4) The upper end of the inner tube 115 is closed, while the lower end of the inner tube 115 is open. Therefore, when the inflator 121 discharges inflation gas, the inflation gas flows into the airbag 110 via the lower end of the inner tube 115 to deploy and inflate the airbag 110. At this time, since the inflation gas does not flow out upward from the inner tube 115, the forward deployment and inflation of the airbag 110 is more promoted than the upward deployment and inflation. As a result, the airbag 110 is quickly deployed and inflated forward from the backrest 13 of the vehicle seat 10 to partition the two seat arranged in the vehicle widthwise direction from each other.

(5) When deployed and inflated, the airbag 110 is held between the center console box 300 and the vehicle seat 10. That is, the airbag 110 in a deployed and inflated state is restrained from being displaced in the vehicle widthwise direction by the center console box 300 and the vehicle seat 10. Thus, it is possible to properly protect the occupant seated in the vehicle seat 10 with the airbag 110.

The above described embodiment may be modified as follows.

The method for folding the airbag 110 is not limited to the one illustrated in the above embodiment but may be changed as long as it promotes the upward deployment and inflation of the airbag 110 more than the forward deployment and inflation. For example, the direction of the roll-folding may be opposite to the one in the above illustrated embodiment.

If the folding method of the above illustrated embodiment is employed as the method for folding the airbag 110, the cross-sectional area of the upward passage 118 may be equal to that of the forward passage 119. With this structure also, advantages are provided that are the equivalent to the advantages (1) and (2).

Of the ends S21 and S22 of the seam S2, the end S21, which is located on the upper side, may be connected to the seam S1. In this case, since the upward passage 118 is not formed, the upper end of the inner tube 115 is opened and the lower end is closed. The inflator 121 is arranged in the inner tube 115 such that the end to which the wire 120 is connected is located on the upper side and the end through which inflation gas is discharged is located on the lower side. Even in this configuration, inflation gas that is discharged into the first inflation chamber 110A from the inflator 121 flows into the second inflation chamber 110B via the forward passage 119. This promotes the forward deployment and inflation of the airbag 110 more than the upward deployment and inflation. The inner tube 115 may be included in the deployment promoting structure.

The above illustrated embodiment has the inner tube 115, which accommodates the inflator 121. However, the inner tube 115 may be omitted and the inflator 121 may be directly accommodated in the airbag 110.

Not limited to the structure in which the single base fabric sheet 114 is folded into a bag shape, the airbag 110 may be formed by overlaying two base fabric sheets onto each other and sewing these together. Alternatively, three or more base fabric sheets may be connected together to form an airbag.

Instead of sewing, the airbag 110 may be formed by bonding a base fabric sheet 114 using an adhesive.

Figure 11:
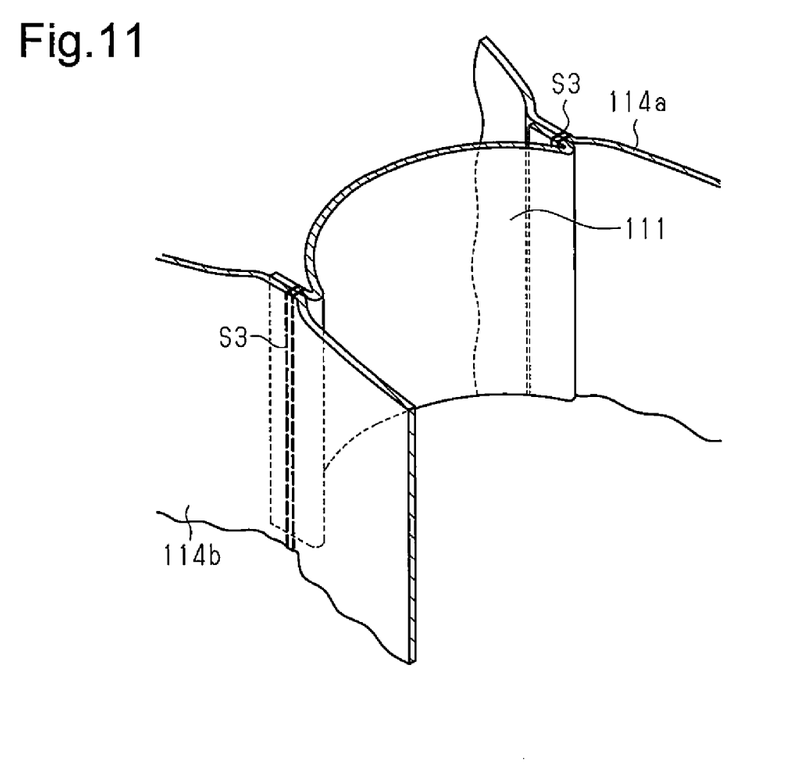
FIG. 11 is a cross-sectional perspective view of an airbag, showing a state of a partition wall formed in the airbag.

For example, as shown in FIG. 11, a tether 111 may be provided to bridge the inner panel 114a and the outer panel 114b to form a partition that divides inflation chambers from each other. FIG. 11 is a perspective view, with a part cut away, illustrating the interior of the airbag 110 at a part Y, which is surrounded by a broken line in FIG. 5, as viewed in the direction of the hollow arrow.

In the illustrated embodiment, the airbag 110 has the first inflation chamber 110A, the second inflation chamber 110B, and the third inflation chamber 110C. However, the shape and the number of the inflation chambers and the manner in which the inflation chambers are partitioned may be changed as necessary.

Vehicles to which the far-side airbag apparatus according to the present invention is applied include various industrial vehicles in addition to private automobiles.

The invention claimed is:

1. A far-side airbag apparatus configured to be fixed to a seat frame of a backrest of a vehicle seat, the apparatus comprising:
    an airbag;
    an inflation fluid generator, which discharges inflation fluid for deploying and inflating the airbag; and
    a deployment promoting structure, wherein, when the inflation fluid generator discharges inflation fluid, the deployment promoting structure deploys and inflates the airbag toward a center of a passenger compartment and promotes forward deployment and inflation of the airbag more than upward deployment and inflation of the airbag, wherein the deployment promoting structure includes:
    a roll-folded part having a rod-like shape, which is formed by roll-folding the airbag halfway from a top toward the inflation fluid generator; and
    an accordion-folded part having a sectoral shape, which is formed by accordion-folding the remainder of the airbag rearward such that, with an end of the roll-folded part closer to the inflation fluid generator serving as a center, another end of the roll-folded part approaches the inflation fluid generator.

2. The far-side airbag apparatus according to claim 1, wherein
    the far-side airbag apparatus is configured to be installed in a vehicle having a center console box, and
    the airbag has a vertical dimension that is set such that, when the airbag is deployed and inflated, a lower end of the airbag is located below the upper end of the center console box.

3. The far-side airbag apparatus according to claim 1, wherein
    the seat frame has a gutter-like cross section,
    the seat frame is embedded in a part of the backrest that corresponds to the center of the passenger compartment such that the inside of the gutter faces the center of the seat,
    the far-side airbag apparatus is fixed to a side surface of the seat frame that corresponds to the center of the passenger compartment,
    the far-side airbag apparatus comprises an outer tension belt having a first end and a second end,
    the outer tension belt is wound about a rear end of the seat frame,
    the first end is connected to a side surface of the airbag that corresponds to the center of the passenger compartment when the airbag is deployed, and
    the second end is connected to the inside of the gutter of the seat frame.

4. The far-side airbag apparatus according to claim 3, further comprising an inner tension belt having a first end and a second end, wherein
    the inner tension belt is wound about a front end of the seat frame,
    the first end is connected to a side surface of the airbag that corresponds to the center of the seat when the airbag is deployed, and
    the second end is connected to the inside of the gutter of the seat frame.

5. The far-side airbag apparatus according to claim 4, wherein
    the far-side airbag apparatus is fixed to the seat frame by passing a bolt through the seat frame and threading a nut to the bolt from the inside of the gutter of the seat frame, and
    the bolt extends through the second end of the outer tension belt and the second end of the inner tension belt so that the second ends are held between the seat frame and the nut.

6. The far-side airbag apparatus according to claim 3, wherein
    the far-side airbag apparatus is fixed to the seat frame by passing a bolt through the seat frame and threading a nut to the bolt from the inside of the gutter of the seat frame, and
    the bolt extends through the second end of the outer tension belt so that the second end is held between the seat frame and the nut.

7. The far-side airbag apparatus according to claim 3, wherein
    the outer tension belt has a vertical dimension that is set such that, when the airbag is deployed and inflated, an upper end of the outer tension belt is located above a part of the airbag that accommodates the inflation fluid generator.

8. A far-side airbag apparatus, configured to be fixed to a seat frame of a backrest of a vehicle seat, the apparatus comprising:
    an airbag;
    an inflation fluid generator, which discharges inflation fluid for deploying and inflating the airbag; and
    a deployment promoting structure, wherein, when the inflation fluid generator discharges inflation fluid, the deployment promoting structure deploys and inflates the airbag toward a center of a passenger compartment and promotes forward deployment and inflation of the airbag more than upward deployment and inflation of the airbag, wherein
    the airbag includes a partition, the partition dividing the airbag into a first inflation chamber, which accommodates the fluid generator, and a second inflation chamber, which is inflated with inflation fluid that has flowed out of the first inflation chamber,
    passages through which inflation fluid flows from the first inflation chamber to the second inflation chamber include a forward passage, through which inflation fluid is discharged forward from the first inflation chamber, and an upward passage, through which inflation fluid is discharged upward from the first inflation chamber, and
    the deployment promoting structure includes a structure in which a cross-sectional area of the forward passage is larger than a cross-sectional area of the upper passage.

9. The far-side airbag apparatus according to claim 8, wherein
    the far-side airbag apparatus is configured to be installed in a vehicle having a center console box, and
    the airbag has a vertical dimension that is set such that, when the airbag is deployed and inflated, a lower end of the airbag is located below the upper end of the center console box.

10. The far-side airbag apparatus according to claim 8, wherein
    the seat frame has a gutter-like cross section,
    the seat frame is embedded in a part of the backrest that corresponds to the center of the passenger compartment such that the inside of the gutter faces the center of the seat, the far-side airbag apparatus is fixed to a side surface of the seat frame that corresponds to the center of the passenger compartment, the far-side airbag apparatus comprises an outer tension belt having a first end and a second end, the outer tension belt is wound about a rear end of the seat frame, the first end is connected to a side surface of the airbag that corresponds to the center of the passenger compartment when the airbag is deployed, and the second end is connected to the inside of the gutter of the seat frame.

11. The far-side airbag apparatus according to claim 10, further comprising an inner tension belt having a first end and a second end, wherein the inner tension belt is wound about a front end of the seat frame, the first end is connected to a side surface of the airbag that corresponds to the center of the seat when the airbag is deployed, and the second end is connected to the inside of the gutter of the seat frame.

12. The far-side airbag apparatus according to claim 11, wherein the far-side airbag apparatus is fixed to the seat frame by passing a bolt through the seat frame and threading a nut to the bolt from the inside of the gutter of the seat frame, and the bolt extends through the second end of the outer tension belt and the second end of the inner tension belt so that the second ends are held between the seat frame and the nut.

13. The far-side airbag apparatus according to claim 10, wherein the far-side airbag apparatus is fixed to the seat frame by passing a bolt through the seat frame and threading a nut to the bolt from the inside of the gutter of the seat frame, and the bolt extends through the second end of the outer tension belt so that the second end is held between the seat frame and the nut.

14. The far-side airbag apparatus according to claim 10, wherein the outer tension belt has a vertical dimension that is set such that, when the airbag is deployed and inflated, an upper end of the outer tension belt is located above a part of the airbag that accommodates the inflation fluid generator.

15. A far-side airbag apparatus, configured to be fixed to a seat frame of a backrest of a vehicle seat, the apparatus comprising:

an airbag;

an inflation fluid generator, which discharges inflation fluid for deploying and inflating the airbag; and a deployment promoting structure, wherein, when the inflation fluid generator discharges inflation fluid, the deployment promoting structure deploys and inflates the airbag toward a center of a passenger compartment and promotes forward deployment and inflation of the airbag more than upward deployment and inflation of the airbag, wherein the deployment promoting structure includes an inner tube, which is provided in the airbag and has a closed upper end, and the inflation fluid generator is accommodated in the inner tube.

16. The far-side airbag apparatus according to claim 15, wherein the seat frame has a gutter-like cross section, the seat frame is embedded in a part of the backrest that corresponds to the center of the passenger compartment such that the inside of the gutter faces the center of the seat, the far-side airbag apparatus is fixed to a side surface of the seat frame that corresponds to the center of the passenger compartment, the far-side airbag apparatus comprises an outer tension belt having a first end and a second end, the outer tension belt is wound about a rear end of the seat frame, the first end is connected to a side surface of the airbag that corresponds to the center of the passenger compartment when the airbag is deployed, and the second end is connected to the inside of the gutter of the seat frame.

17. The far-side airbag apparatus according to claim 16, further comprising an inner tension belt having a first end and a second end, wherein the inner tension belt is wound about a front end of the seat frame, the first end is connected to a side surface of the airbag that corresponds to the center of the seat when the airbag is deployed, and the second end is connected to the inside of the gutter of the seat frame.

18. The far-side airbag apparatus according to claim 17, wherein the far-side airbag apparatus is fixed to the seat frame by passing a bolt through the seat frame and threading a nut to the bolt from the inside of the gutter of the seat frame, and the bolt extends through the second end of the outer tension belt and the second end of the inner tension belt so that the second ends are held between the seat frame and the nut.

19. The far-side airbag apparatus according to claim 16, wherein the far-side airbag apparatus is fixed to the seat frame by passing a bolt through the seat frame and threading a nut to the bolt from the inside of the gutter of the seat frame, and the bolt extends through the second end of the outer tension belt so that the second end is held between the seat frame and the nut.

20. The far-side airbag apparatus according to claim 16, wherein the outer tension belt has a vertical dimension that is set such that, when the airbag is deployed and inflated, an upper end of the outer tension belt is located above a part of the airbag that accommodates the inflation fluid generator.

* * * * *